United States Patent [19]

Ase et al.

[11] Patent Number: 4,847,056

[45] Date of Patent: Jul. 11, 1989

[54] METHOD FOR REMOVING HYDROGEN CHLORIDE FROM EXHAUST GAS DISCHARGED FROM INCINERATOR

[75] Inventors: Hajime Ase; Satoshi Fujii; Hisao Nara; Masao Sakai, all of Tokyo, Japan

[73] Assignee: Nippon Kokan Kabushiki Kaisha, Tokyo, Japan

[21] Appl. No.: 201,483

[22] Filed: Jun. 1, 1988

[30] Foreign Application Priority Data

Jun. 23, 1987 [JP] Japan .................. 62-154415

[51] Int. Cl.$^4$ .............................................. C01B 7/00
[52] U.S. Cl. .................................................. 423/240
[58] Field of Search .................. 423/240 R, 240 S

[56] References Cited

U.S. PATENT DOCUMENTS

| 4,246,242 | 1/1981 | Butler et al. ........................ 423/240 |
| 4,302,205 | 11/1981 | Muraki et al. ..................... 23/239 R |
| 4,565,679 | 1/1986 | Michalak et al. ............... 423/239 A |

FOREIGN PATENT DOCUMENTS

| 0103881 | 3/1984 | European Pat. Off. |
| 0173403 | 7/1986 | European Pat. Off. |
| 2803876 | 9/1978 | Fed. Rep. of Germany |
| 60-38024 | 2/1985 | Japan ........................... 423/240 S |

*Primary Examiner*—Gregory A. Heller
*Attorney, Agent, or Firm*—Frishauf, Holtz, Goodman & Woodward

[57] ABSTRACT

A method for removing hydrogen chloride from an exhaust gas discharged from an incinerator, which comprises the steps of: causing hydrogen chloride contained in an exhaust gas discharged from an incinerator to react with slaked lime in slurry to form basic calcium chloride; detecting a concentration (y) of hydrogen chloride remaining in the exhaust gas after the reaction with slaked lime; determining a deviation ($\Delta y$) of the thus detected concentration (y) of hydrogen chloride from a target concentration ($y_o$) thereof; determining a corrected deviation ($\Delta y'$) by adding to the above-mentioned deviation ($\Delta y$) a correction value ($\Delta y_1$) calculated in accordance with the following formulae:

$$\Delta y_1 = -G_p(S)(1-e^{-LS})U \qquad (1)$$

$$\Delta y' = \Delta y + \Delta y_1 \qquad (2)$$

where,
  $G_p(S)$: a transfer function representing a first order lag,
  $e^{-iLS}$: a transfer function representing a dead time, and
  U: a target amount of supply of slaked lime, which renders the deviation ($\Delta y$) zero;

determining a target amount of supply (U) of slaked lime, which renders the thus determined corrected deviation ($\Delta y'$) zero; and adjusting an amount of supply of slaked lime so that the amount of supply of slaked lime agrees with the thus determined target amount of supply (U) of slaked lime; thereby removing hydrogen chloride from the exhaust gas discharged from the incinerator.

1 Claim, 7 Drawing Sheets

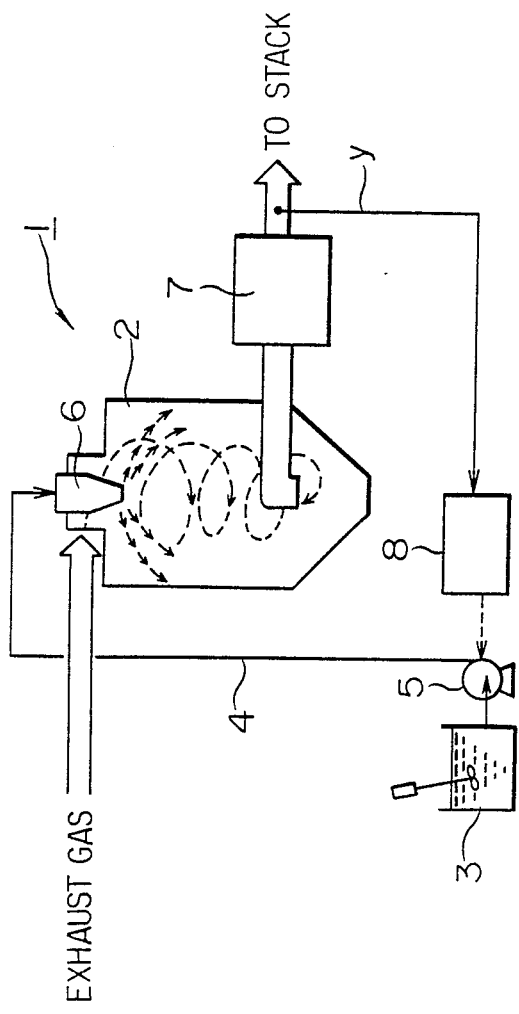
FIG. I
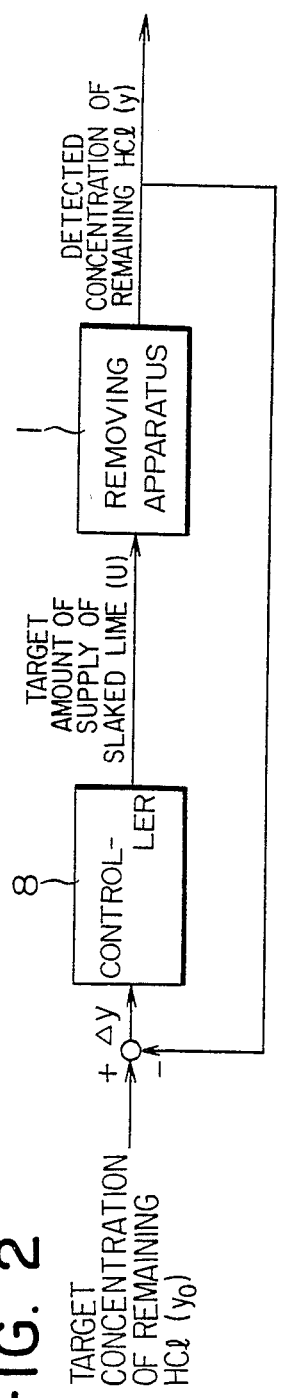
FIG. 2

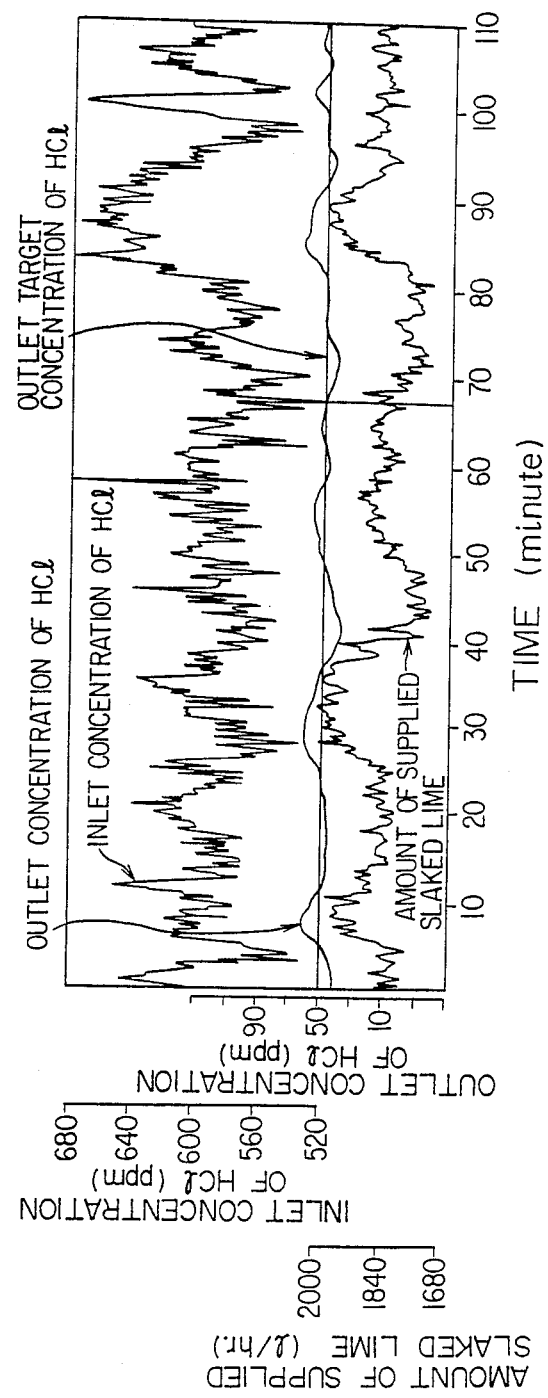

METHOD FOR REMOVING HYDROGEN CHLORIDE FROM EXHAUST GAS DISCHARGED FROM INCINERATOR

FIELD OF THE INVENTION

The present invention relates to a method for removing hydrogen chloride from an exhaust gas discharged from an incinerator.

BACKGROUND OF THE INVENTION

In an incinerator of garbage discharged from the general household, hydrogen chloride (HCl) generates from chlorine-containing substances such as vinyl chloride contained in garbage, and discharged from the incinerator in the form of hydrogen chloride gas contained in an exhaust gas as produced from incineration of garbage. Therefore, the exhaust gas discharged from the garbage incinerator has to be released to the open air after removing hydrogen chloride contained therein to a concentration below a prescribed emission standard value of hydrogen chloride.

The following method using a semi-dry type removing apparatus is conventionally known for the purpose of removing hydrogen chloride contained in an exhaust gas discharged from an incinerator.

FIG. 1 is a conceptual view illustrating a conventional semi-dry type apparatus for removing hydrogen chloride from an exhaust gas discharged from an incinerator. This apparatus 1 basically comprises a reactor 2 for removing hydrogen chloride contained in an exhaust gas discharged from an incinerator, a tank 3 for storing slaked lime in slurry, a pump 5 for supplying slaked lime stored in the tank 3 through a supply pipe 4 into the reactor 2, an atomizer 6 for atomizing the supplied slaked lime into the reactor 2, and an electrostatic dust collector 7 for removing a reaction product entrapped in the exhaust gas discharged from the reactor 2. In FIG. 1, 8 is a controller, added to the removing apparatus 1, for adjusting an amount of supply of slaked lime into the reactor 2.

Using the conventional semi-dry type removing apparatus 1 mentioned above, hydrogen chloride contained in an exhaust gas discharged from an incinerator is practically removed therefrom as follows.

The exhaust gas discharged from the incinerator is cooled to a temperature of from about 280° to about 300° C. through exchange in a boiler or the like, and then continuously introduced from above into the reactor 2. On the other hand, slaked lime in slurry stored in the tank 3 is continuously supplied into the reactor 2 through the supply pipe 4 by means of the pump 5, and is atomized in the reactor 2 by means of the atomizer 6. Hydrogen chloride contained in the exhaust gas discharged from the incinerator comes into contact and reacts with the thus atomized slaked lime in the reactor 2 to form a reaction product in the form of basic calcium chloride ($CaCl_2 \cdot Ca(OH)_2 \cdot H_2O$), and removed from the exhaust gas. Removal of hydrogen chloride from the exhaust gas discharged from the incinerator is accomplished by adjusting the amount of supply of slaked lime into the reactor 2 by means of the controller 8 so that the concentration of hydrogen chloride remaining in the exhaust gas discharged from the reactor 2 after the reaction with slaked lime agrees to a predetermined target concentration thereof. Control of the concentration of hydrogen chloride remaining in the exhaust gas discharged from the reactor 2 after the reaction with slaked lime will be described later. The reaction product produced from the reaction of hydrogen chloride with slaked lime is converted into dried powder under the effect of the heat of the exhaust gas, is accumulated in the lower portion of the reactor 2, and is discharged from the lower end of the reactor 2. The exhaust gas from which hydrogen chloride has thus been removed is introduced from the reactor 2 into the electrostatic dust collector 7, in which the reaction product and dust entrapped in the exhaust gas are removed, and then released to the open air through a stack not shown.

FIG. 2 is a block diagram illustrating a control system of the reaction process of hydrogen chloride with slaked lime, in the conventional method for removing hydrogen chloride from an exhaust gas discharged from an incinerator with the use of a known semidry type removing apparatus. The control system of the reaction process comprises the removing apparatus 1 and the controller 8 shown in FIG. 1. Control of the concentration of hydrogen chloride remaining in the exhaust gas discharged from the reactor 2 after the reaction with slaked lime is conducted as shown in FIG. 2. As shown in FIG. 2, the concentration (y) of hydrogen chloride remaining in the exhaust gas discharged from the reactor 2 after the reaction with slaked lime is detected at a position in the downstream of the electrostatic dust collector 7, for example, of the removing apparatus 1. Then a deviation ($\Delta y$) of the thus detected concentration (y) of hydrogen chloride from a predetermined target concentration ($y_o$) thereof is determined. The thus determined deviation ($\Delta y$) is entered into the controller 8 as an actuating signal. The controller 8 determines a target amount of supply (U) of slaked lime into the reactor 2, which is necessary for reducing the thus determined deviation ($\Delta y$) to zero, through, for example, a PID action (proportion (P)+integration (I)+ differentiation (D) action). The controller 8 adjusts an amount of supply of slaked lime into the reactor 2 so that the amount of supply of slaked lime agrees to the thus determined target amount of supply (U) of slaked lime by changing the revolutions of the pump 5 or altering opening of a flow adjusting valve not shown provided in the middle of the supply pipe 4, whereby the concentration of hydrogen chloride remaining in the exhaust gas discharged from the reactor 2 after the reaction with slaked lime is controlled so that the above-mentioned deviation ($\Delta y$) becomes zero, in other words, so that the above-mentioned detected concentration (y) of hydrogen chloride agrees to the predetermined target concentration ($y_o$) thereof.

In the above-mentioned conventional method, using the known semi-dry type removing apparatus, the reaction process of hydrogen chloride with slaked lime has an important meaning for the control of the concentration of hydrogen chloride remaining in the exhaust gas discharged from the reactor 2 after the reaction with slaked lime. FIG. 3 is a graph illustrating an example of the step response between the amount of supply of slaked lime into the reactor 2 and the concentration of hydrogen chloride remaining in the exhaust gas discharged from the reactor 2 after the reaction with slaked lime, in the reaction process in the conventional method as described above. In FIG. 3, "INLET CONCENTRATION OF HCl" expresses the concentration of hydrogen chloride in the exhaust gas at the inlet of the reactor 2, "OUTLET CONCENTRATION OF HCl", the concentration of hydrogen chloride in the exhaust gas at the outlet of the reactor 2, and "AMOUNT OF SUPPLIED SLAKED LIME", the amount of slaked lime supplied into the reactor 2. According to FIG. 3, the step response in the reaction process of hydrogen chloride with slaked lime can be approximated to a "dead time+first order lag" system in terms of the dynamic characteristics. FIG. 4 is a graph illustrating a dead time and a time constant in the reaction process of hydrogen chloride with slaked lime in the conventional method. As is clear from FIG. 4, the reaction process has a dead time of about three minutes and a time constant of about one minute. While these values vary with the size of the removing apparatus 1, the dead time is generally far larger than the time constant.

In the case where the dynamic characteristic of the reaction process has a large value of dead time as above, it is difficult to control the concentration of hydrogen chloride remaining in the exhaust gas discharged from the reactor 2 after the reaction with slaked lime as described above, by determining the deviation ($\Delta y$) of the detected concentration (y) of hydrogen chloride remaining in the exhaust gas from the target concentration ($y_o$) thereof, this being a fact well known in the field of the control theory. When it is attempted to remove hydrogen chloride from the exhaust gas by the conventional method so that the concentration of hydrogen chloride remaining in the exhaust gas stably agrees with the predetermined target concentration thereof, it is imperative to reduce gain in the control system of the reaction process. With a lower gain in the control system of the reaction process, elimination of the deviation ($\Delta y$) requires much time even when the deviation ($\Delta y$) becomes larger, resulting in deterioration of control of the concentration of hydrogen chloride remaining in the exhaust gas. FIG. 5 is a graph illustrating an example of change in the concentration of hydrogen chloride reamining in the exhaust gas after the reaction with slaked lime in the case where hydrogen chloride is removed from the exhaust gas by the conventional method. In FIG. 5, "INLET CONCENTRATION OF HCl" expresses the concentration of hydrogen chloride in the exhaust gas at the inlet of the reactor 2, "OUTLET CONCENTRATION OF HCl", the concentration of hydrogen chloride in the exhaust gas at the outlet of the reactor 2, "OUTLET TARGET CONCENTRATION OF HCl", the predetermined target concentration of hydrogen chloride in the exhaust gas at the outlet of the reactor 2, and "AMOUNT OF SUPPLIED SLAKED LIME", the amount of slaked lime supplied into the reactor 2. In the conventional method, as is clear from FIG. 5, control accuracy of the concentration of hydrogen chloride remaining in the exhaust gas is low, largely varying around the target concentration thereof.

Therefore, for the purpose of removing hydrogen chloride contained in the exhaust gas discharged from the incinerator to a concentration below the prescribed emission standard value of hydrogen chloride, it is necessary for the above-mentioned conventional method to set the target concentration ($y_o$) of hydrogen chloride remaining in the exhaust gas discharged from the reactor 2 after the reaction with slaked lime to a value sufficiently lower than the prescribed emission standard value of hydrogen chloride to control the concentration of hydrogen chloride remaining in the exhaust gas discharged from the reactor 2. However, this requires an excessive amount of supply of slaked lime into the reactor 2, resulting in not only a higher cost for the removal of hydrogen chloride from the exhaust gas but also a heavier load of slaked lime entrapped in the exhaust gas after the reaction with hydrogen chloride on the electrostatic dust collector 7, thus leading to troubles therein.

Under such circumstances, there is a strong demand for the development of a method for removing hydrogen chloride from an exhaust gas discharged from an incinerator, which permits removal of hydrogen chloride contained in the exhaust gas discharged from the incinerator so that the concentration of hydrogen chloride remaining in the exhaust gas after the reaction with slaked lime stably agrees with a target concentration thereof by taking proper measures against a dead time in the control system of the reaction process of hydrogen chloride with slaked lime, but a method provided with such features has not a yet been proposed.

SUMMARY OF THE INVENTION

An object of the present invention is therefore to provide a method for removing hydrogen chloride from an exhaust gas discharged from an incinerator, which permits removal of hydrogen chloride contained in the exhaust gas discharged from the incinerator so that the concentration of hydrogen chloride remaining in the exhaust gas after the reaction with slaked lime stably agrees with a target concentration thereof by taking proper measures against a dead time in the control system of the reaction process of hydrogen chloride with slaked lime.

In accordance with one of the features of the present invention, in a method for removing hydrogen chloride from an exhaust gas discharged from an incinerator, which comprises the steps of:

causing hydrogen chloride contained in an exhaust gas discharged from an incinerator to react with slaked lime in slurry to form basic calcium chloride;

detecting a concentration (y) of said hydrogen chloride remaining in said exhaust gas after said reaction with said slaked lime;

determining a deviation ($\Delta y$) of said detected concentration (y) of said hydrogen chloride from a target concentration ($y_o$) thereof;

determining a target amount of supply (U) of said slaked lime, which renders said deviation ($\Delta y$) zero; and adjusting an amount of supply of said slaked lime so that said amount of supply of said slaked lime agrees with said determined target amount of supply (U) thereof;

thereby removing said hydrogen chloride from said exhaust gas;

there is provided the improvement comprising determining a corrected deviation ($\Delta y'$) by adding to said deviation ($\Delta y$) a correction value ($\Delta y_1$) calculated in accordance with the following formulae:

$$\Delta y_1 = -G_p(S)(1-e^{-LS})U \quad (1)$$

$$\Delta y' = \Delta y + \Delta y_1 \quad (2)$$

where,

Gp(S): a transfer function representing a first order lag in case said reaction of said hydrogen chloride with said slaked lime, is approximated to a "dead time+first order lag" system $e^{-LS}$: a transfer function representing a dead time in case said reaction of said hydrogen chloride with said slaked lime, is approximated to said "dead time+first order lag" system and U: a target amount of supply of said slaked lime, which renders said deviation (Δy) zero; and using said corrected deviation (Δy') as said deviation (Δy).

BRIEF DESCRIPTION OF THE DRAWINGS

FIG. 1 is a conceptual view illustrating a conventional semi-dry type apparatus for removing hydrogen chloride from an exhaust gas discharged from an incinerator;

FIG. 2 is a block diagram illustrating a control system of the reaction process of hydrogen chloride with slaked lime, in a conventional method for removing hydrogen chloride from an exhaust gas discharged from an incinerator with the use of the known semi-dry type removing apparatus as shown in FIG. 1;

FIG. 7 is a graph illustrating an example of change in the concentration of hydrogen chloride remaining in the exhaust gas after the reaction with slaked lime in the case where hydrogen chloride is removed from the exhaust gas by the method of the present invention.

DETAILED DESCRIPTION OF PREFERRED EMBODIMENTS

From the above-mentioned point of view, extensive studies were carried out with a view to developing a method for removing hydrogen chloride from an exhaust gas discharged from an incinerator, which permits removal of hydrogen chloride contained in the exhaust gas discharged from the incinerator so that the concentration of hydrogen chloride remaining in the exhaust gas after the reaction with slaked lime stably agrees with a target concentration thereof by taking proper measures against a dead time in the control system of the reaction process of hydrogen chloride with slaked lime. As a result, the following finding was obtained. More specifically, it is possible to take proper means against a dead time in the control system of the reaction process of hydrogen chloride with slaked lime, and therefore to control the reaction of hydrogen chloride with slaked lime so that the concentration (y) of hydrogen chloride remaining in the exhaust gas after the reaction with slaked lime stably agrees with the target concentration ($y_o$) of hydrogen chloride, by using a corrected deviation (Δy'), which is obtained by adding a correction value ($Δy_1$) calculated in accordance with the following formulae:

$$Δy_1 = -Gp(S)(1-e^{-LS})U \quad (1)$$

$$Δy' = Δy + Δy_1 \quad (2)$$

where,

Gp(S): a transfer function representing a first order lag in case the reaction of hydrogen chloride with slaked lime; is approximated to a "dead time+first order lag" system $e^{-LS}$: a transfer function representing a dead time in case the reaction of hydrogen chloride with slaked lime is approximated to the "dead time+first order lag" system; and U: a target amount of supply of slaked lime, which renders the deviation (Δy) zero; to the deviation (Δy) of the concentration (y) of hydrogen chloride remaining in the exhaust gas after the reaction with slaked lime from the concentration ($y_o$) of hydrogen chloride, which deviation (Δy) is used, in the above-mentioned conventional method, for determining the target amount of supply (U) of slaked lime.

The present invention was made on the basis of the above-mentioned finding. Now, the method of the present invention for removing hydrogen chloride from an exhaust gas discharged from an incinerator is described in detail with reference to the drawings.

Figure 3:
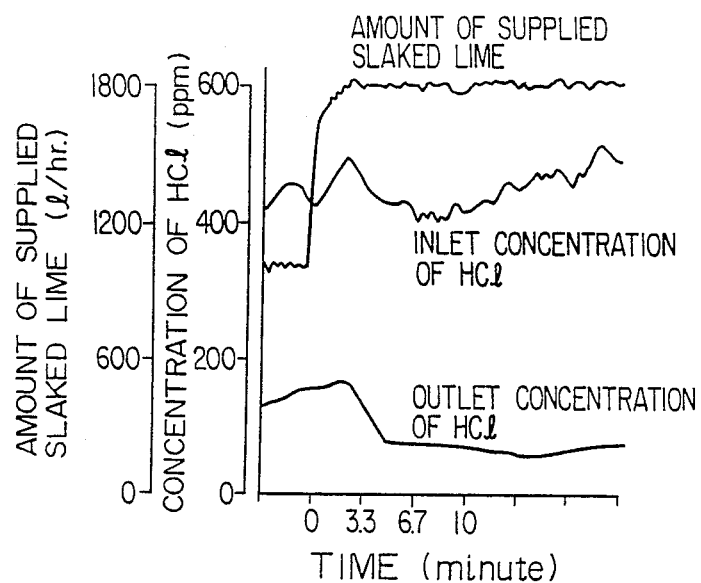
FIG. 3 is a graph illustrating an exmaple of the step response between an amount of supply of slaked lime into a reactor and a concentration of hydrogen chloride remaining in an exhaust gas discharged from the reactor after the reaction with slaked lime, in the reaction process in the conventional method.
Figure 4:
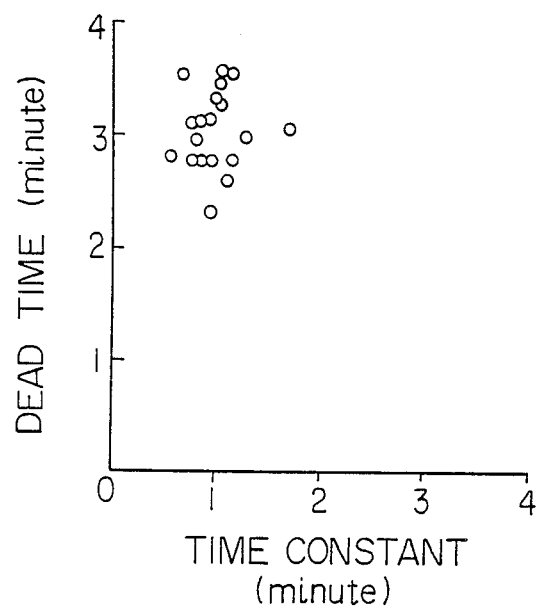
FIG. 4 is a graph illustrating a dead time and a time constant in the reaction of hydrogen chloride with slaked lime in the conventional method.
Figure 5:
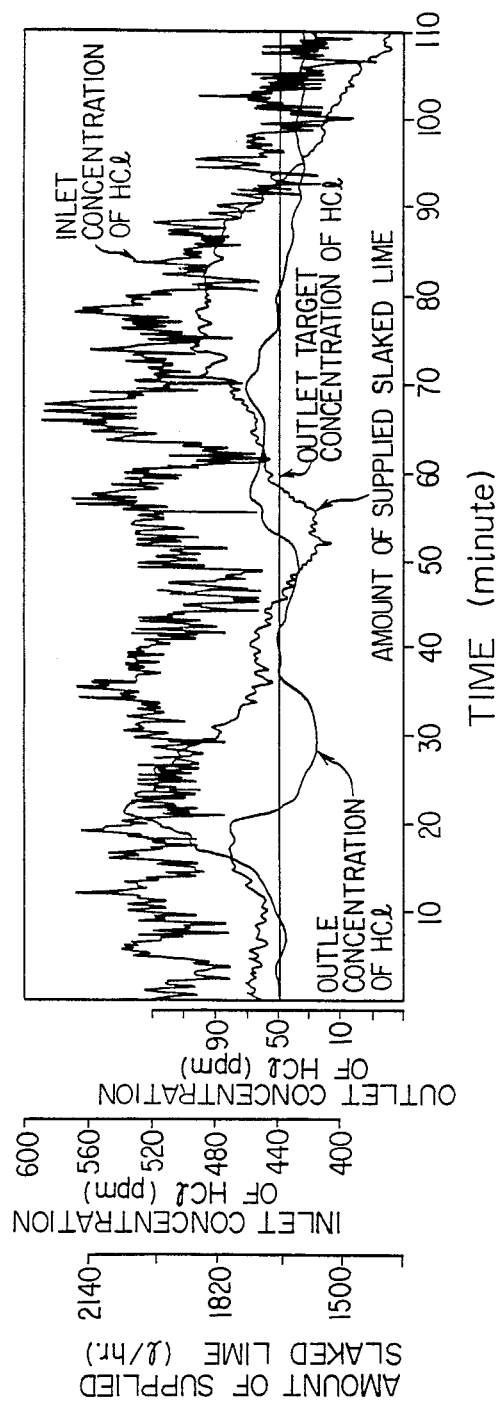
FIG. 5 is a graph illustrating an example of change in the concentration of hydrogen chloride remaining in the exhaust gas after the reaction with slaked lime in the case where hydrogen chloride is removed from the exhaust gas by the conventional method.
Figure 6:
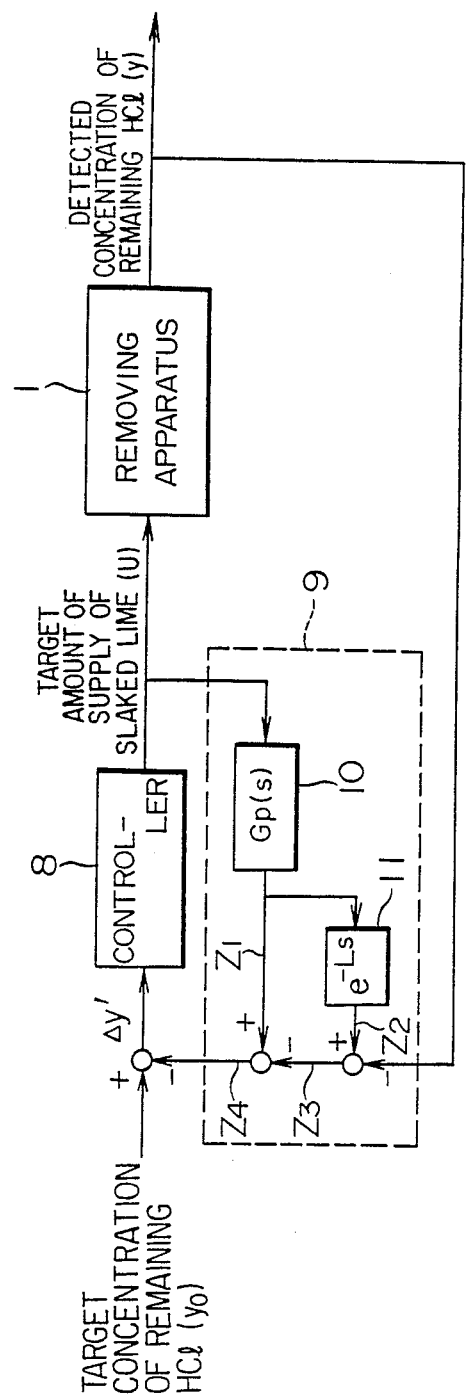
FIG. 6 is a block diagram illustrating a control system of the reaction process of hydrogen chloride with slaked lime, in the method of the present invention for removing hydrogen chloride from an exhaust gas discharged from an incinerator with the use of the known semi-dry type removing apparatus as shown in FIG. 1.

FIG. 6 is a block diagram illustrating a control system of the reaction process of hydrogen chloride with slaked lime, in the method of the present invention for removing hydrogen chloride from an exhaust gas discharged from an incinerator with the use of the known semi-dry type removing apparatus as shown in FIG. 1. In FIG. 6, 1 is a removing apparatus similar to that shown in FIG. 1, 8 is a controller similar to that shown in FIG. 1, and 9 is a prediction/elimination mechanism. As shown in FIG. 6, the control system of the reaction process of hydrogen chloride with slaked lime in the method of the present invention is different from that in the conventional method in that the prediction/elimination mechanism 9 is added to the control system of the reaction process of hydrogen chloride with slaked lime in the conventional method shown in FIG. 2. The other particulars of the method of the present invention are similar to those in the conventional method, and hydrogen chloride is removed from an exhaust gas discharged from an incinerator, in a manner similar to that in the conventional method described above with reference to FIGS. 1 and 2.

The prediction/elimination mechanism 9 determines a predicted value containing a dead time of the concentration of hydrogen chloride remaining in the exhaust gas after the reaction with slaked lime, on the basis of the target amount of supply (U) of slaked lime into the reactor 2 as determined by the controller 8, and eliminates the dead time from the closed loop of the control system by using the above-mentioned predicted value. The reaction process of hydrogen chloride with slaked lime can be approximated to the "dead time+first order lag" system in terms of the dynamic characteristics as described above. Therefore, the transfer function of the reaction process of hydrogen chloride with slaked lime may be expressed as the product, $Gp(S)e^{-LS}$, of the transfer function, Gp(S), representing the first order lag in the reaction process and the transfer function, $e^{-LS}$, representing the dead time in the reaction process. The prediction/elimination mechanism 9 includes a first multiplying element 10 for multiplying the transfer function, Gp(S), representing the first order lag in the reaction process and a second multiplying element 11 for multiplying the transfer function, $e^{-LS}$, representing the dead time in the reaction process.

The prediction/elimination mechanism 9 conducts the following operations. When the controller 8 determines the target amount of supply (U) of slaked lime into the reactor 2, the prediction/elimination mechanism 9 enters the thus determined amount of supply (U) of slaked lime into the first multiplying element 10 to multiply the target amount of supply (U) of slaked lime by the transfer function, Gp(S), representing the first order lag to determine a predicted value, $Z_1 = Gp(S)U$, not containing a dead time, of the concentration of hydrogen chloride remaining in the exhaust gas after the reaction with slaked lime. Then, the prediction/elimination mechanism 9 enters the thus determined predicted value, $Z_1$, not containing the dead time, into the second multiplying element 11 to multiply the predicted value, $Z_1$, by the transfer function, $e^{-LS}$, representing the dead time, to determine another predicted value, $Z_2 = Z_1 e^{-LS} = Gp(S)e^{-LS}U$, containing the dead time, of the concentration of hydrogen chloride remaining in the exhaust gas after the reaction with slaked lime. Subsequently, the prediction/elimination mechanism 9 determines the difference, $Z_3 = Z_2 - y$, between the detected concentration (y) of hydrogen chloride remaining in the exhaust gas after the reaction with slaked lime and the above-mentioned predicted value ($Z_2$) containing the dead time. Then, the prediction/elimination mechanism 9 determines the difference, $Z_4 = Z_1 - Z_3$, between the above-mentioned difference ($Z_3$) and the predicted value ($Z_1$) not containing the dead time, and enters the deviation, $\Delta y' = y_o - Z_4$, of the difference ($Z_4$) from the target concentration ($y_o$) of hydrogen chloride remaining in the exhaust gas after the reaction with slaked lime into the controller 8 as the actuating signal.

As mentioned above, the following equations are properly held:

$Z_1 = Gp(S)U$, $Z_2 = Gp(S)e^{-LS}U$, $Z_3 = Z_2 - y = Gp(S)e^{-LS}U - y$, $Z_4 = Z_1 - Z_3 = Gp(S)U - (Gp(S)e^{-LS}U - y)$, $$\begin{aligned}\Delta y' &= y_0 - Z_4 = (y_0 - y) - Gp(S)(1 - e^{-LS})U \\ &= \Delta y + \{-Gp(S)(1 - e^{-LS})U\} \\ &= \Delta y + \Delta y_1\end{aligned}$$

Therefore, the deviation, $\Delta y' = y_o - Z_4$, exactly agrees with the deviation, $\Delta y' = \Delta y + \Delta y_1$, which is obtained by adding the correction value, $\Delta y_1 = Gp(S)(-1 - e^{-LS})U$, to the deviation ($\Delta y$) of the detected concentration (y) of hydrogen chloride remaining in the exhaust gas after the reaction with slaked lime from the target concentration ($y_o$) thereof, which deviation ($\Delta y$) is used, in the above-mentioned conventional method, for determining the target amount of supply (U) of slaked lime.

Since the predicted value ($Z_2$) containing the dead time has the function of a predicted value of the concentration of hydrogen chloride remaining in the exhaust gas after the reaction with slaked lime, the above-mentioned difference ($Z_3$) between the predicted value ($Z_2$) containing the dead time and the detected concentration (y) of the hydrogen chloride remaining in the exhaust gas after the reaction with slaked lime becomes $Z_3 = Z_2 - y = 0$. Therefore, the above-mentioned difference ($Z_4$) becomes $Z_4 = Z_1 - Z_3 = Z_1$, and the deviation ($\Delta y'$) becomes $\Delta y' = y_o - Z_4 = y_o - Z_1$. As a result, the detected concentration (y) of the hydrogen chloride remaining in the exhaust gas after the reaction with slaked lime is offset by the predicted value ($Z_2$) containing the dead time of the concentration of the hydrogen chloride remaining in the exhaust gas after the reaction with slaked lime, and thus, the dead time is eliminated from the closed loop of the control system shown in FIG. 6. The deviation ($\Delta y'$) of the predicted value ($Z_1$) not containing the dead time of the concentration of the hydrogen chloride remaining in the exhaust gas after the reaction with slaked lime from the target concentration ($y_o$) thereof is thus entered into the controller 8.

If the transfer function of the controller 8 is Gc(S), for example, then, $U = Gc(S)\Delta y' = Gc(S)(Y_o - Gp(S)(U))$ $\therefore U = Gc(S)y_o/(1 + Gc(S)Gp(S))$ $$\begin{aligned}\therefore y &= Gp(S)\,e^{-LS}\,U \\ &= y_0 \times Gc(S)Gp(S)\,e^{-LS}/(1 + Gc(S)Gp(S)).\end{aligned}$$

By entering the above-mentioned deviation ($\Delta y'$) into the controller 8 as the actuating signal, it is possible to treat the reaction process as not containing a dead time. Therefore, when the controller 8 determines the target amount of supply (U) of slaked lime necessary for nullifying the deviation ($\Delta y'$) by a PID action, for example, on the basis of the entered deviation ($\Delta y'$), and adjusts the amount of supply of slaked lime to the thus determined target amount of supply (U) of slaked lime, the concentration of hydrogen chloride remaining in the exhaust gas after the reaction with slaked lime is controlled so as to stably agree with the target concentration ($y_o$) of hydrogen chloride remaining in the exhaust gas after the reaction with slaked lime.

FIG. 7 is a graph illustrating an example of change in the concentration of hydrogen chloride remaining in the exhaust gas after the reaction with slaked lime in the case where hydrogen chloride is removed from the exhaust gas by the method of the present invention. In FIG. 7, "INLET CONCENTRATION OF HCl" expresses the concentration of hydrogen chloride in the exhaust gas at the inlet of the reactor 2, "OUTLET CONCENTRATION OF HCl", the concentration of hydrogen chloride in the exhaust gas at the outlet of the reactor 2, "OUTLET TARGET CONCENTRATION OF HCl", the predetermined target concentration of hydrogen chloride in the exhaust gas at the outlet of the reactor 2, and "AMOUNT OF SUPPLIED SLAKED LIME", the amount of slaked lime supplied into the reactor 2. According to the method of the present invention, as is clear from FIG. 7, it is possible to remove hydrogen chloride from the exhaust gas in the reactor 2, while causing the concentration of the hydrogen chloride remaining in the exhaust gas after the reaction with slaked lime to stably agree with the target concentration thereof, without largely varying around the target concentration thereof.

According to the method of the present invention, as described above in detail, it is possible to remove hydrogen chloride contained in the exhaust gas discharged from the incinerator so that the concentration of hydrogen chloride remaining in the exhaust gas after the reaction with slaked lime stably agrees with the target concentration thereof

What is claimed is:

1. In a method for removing hydrogen chloride from an exhaust gas discharged from an incinerator, which comprises the steps of:

causing hydrogen chloride contained in an exhaust gas discharged from an incinerator to react with slaked lime in a slurry to form basic calcium chloride;

detecting a concentration (y) of said hydrogen chloride remaining in said exhaust gas after said reaction with said slaked lime;

determining a deviation ($\Delta y$) of said detected concentration (y) of said hydrogen chloride from a target concentration ($y_o$) thereof;

determining a target amount of supply (U) of said slaked lime, which renders said deviation ($\Delta y$) zero; and adjusting an amount of supply of said slaked lime so that said amount of supply of said slaked lime agrees with said determined target amount of supply (U) thereof;

thereby removing said hydrogen chloride from said exhaust gas;

the improvement comprising:

determining a corrected deviation ($\Delta y'$) by adding to said deviation ($\Delta y$) a correction value ($\Delta y_1$) calculated in accordance with the following formulae:

$$\Delta y_1 = -Gp(S)(1-e^{-LS})U \quad (1)$$

$$\Delta y' = \Delta y = \Delta y_1 \quad (2)$$

where,

Gp(S): a transfer function representing a first order lag in case said reaction of said hydrogen chloride with slaked lime is approximated to a "dead time+first order lag" system, $e^{-LS}$: a transfer function represent a dead time in case said reaction of said hydrogen chloride with said slaked lime is approximated to said "dead time+first order lag" system, and U: a target amount of supply of said slaked lime, which renders said deviation ($\Delta y$) zero; and using said corrected deviation ($\Delta y'$) as said deviation ($\Delta y$).

* * * * *

UNITED STATES PATENT AND TRADEMARK OFFICE
CERTIFICATE OF CORRECTION

PATENT NO. : 4,847,056
DATED : July 11, 1989
INVENTOR(S) : ASE et al It is certified that error appears in the above-identified patent and that said Letters Patent is hereby corrected as shown below:

Column 10, Claim 1, line 14, formula (2):

Change "$\Delta y' = \Delta y = \Delta y1$" to --$\Delta y' = \Delta y + \Delta y1$--.

Column 10, Claim 1, line 21:

Change "represent" to --representing--.

Signed and Sealed this

Eighth Day of September, 1992

Attest:

DOUGLAS B. COMER

Attesting Officer    Acting Commissioner of Patents and Trademarks